United States Patent [19]

Blossfeldt

[11] Patent Number: 4,893,337

[45] Date of Patent: Jan. 9, 1990

[54] CIRCUIT ARRANGEMENT FOR A DIGITAL TELEPHONE STATION

[75] Inventor: Dieter Blossfeldt, Munich, Fed. Rep. of Germany

[73] Assignee: Siemens Aktiengesellschaft, Berlin and Munich, Fed. Rep. of Germany

[21] Appl. No.: 204,226

[22] Filed: Jun. 9, 1988

[30] Foreign Application Priority Data

Jul. 30, 1987 [DE] Fed. Rep. of Germany ....... 3725329

[51] Int. Cl.[4] .............................................. H04M 1/00

[52] U.S. Cl. .................................... 379/424; 379/387

[58] Field of Search ............... 379/164, 165, 387, 377, 379/156, 145, 151, 242, 166, 32, 34, 413, 425, 257, 424

[56] References Cited

U.S. PATENT DOCUMENTS 4,488,006 12/1984 Essig et al. .......................... 379/387

4,506,112 3/1985 Bitsch ............................ 379/424 X 4,759,054 7/1988 Mellon ................................ 379/145

*Primary Examiner*—Jin F. Ng

*Assistant Examiner*—Randall S. Vaas

*Attorney, Agent, or Firm*—Hill, Van Santen, Steadman & Simpson

[57] ABSTRACT

A circuit arrangement is provided for digital telephone stations in a digital private branch exchange, whereby control information are constantly exchanged via a subscriber line. The telephone station is controlled by a constantly interrogating and controlling microprocessor. The microprocessor can, for example, be arrested by a disturbing pulse. The invention provides the creation of a simple possibility of providing a reset pulse in an out-of-order case of the microprocessor. This is achieved in that repeated actuation of the cradle switch contact in brief succession charges the capacitor, due to multiple charging surges, the reaches the threshold voltage at the base of the transistor that is needed for this transistor, whereby the transistor is activated and generates the reset pulse.

1 Claim, 1 Drawing Sheet

MICROPROCESSOR
MP
E
Re
U
GU
R2
R1
C1
R3
T1
D
R4
a
C2
R5
T2
R6

CIRCUIT ARRANGEMENT FOR A DIGITAL TELEPHONE STATION

BACKGROUND OF THE INVENTION

1. Field of the Invention:

The present invention relates to a circuit arrangement for a digital telephone station in digital telephone systems, particularly private branch exchanges (PBX's), whereby the telephone station is controlled by a microprocessor and whereby inquiry and control signals are constantly exchanged via the leads of the subscriber line, whereby, furthermore, the feed voltage supply of the telephone station in the quiescent condition and in the voice condition occurs via the subscriber line or via a local voltage source, and whereby the cradle switch contact, in its actuated condition, connects a first control input of the microprocessor to ground via a first ohmic resistor.

2. Description of the Prior Art

Prior known telephone stations are fundamentally controlled by one or more microprocessors. Inquiry and control events, via the subscriber line, are thereby also sequenced during the quiescent condition of the telephone station when, for example, the handset is picked up at such a telephone station and the cradle switch contact is actuated as a result thereof, the microprocessor recognizes this event via a control input during a routine interrogation and interprets the same.

Given disturbing influences, however, such microprocessors tend to block, so that an interrogation no longer occurs and, therefore, a connection cannot be produced after the handset is lifted. It is necessary to reset the microprocessor to an initial position via its reset input, or in some other form, and to allow the microprocessor to restart. This was heretofore carried out in that, for example, a resetting was effected on the basis of a brief disconnection of the local feed or of the remote feed.

SUMMARY OF THE INVENTION

The object of the present invention, therefore, is to provide a possibility with which the out-of-order condition can be ended in a simple manner, particularly in providing this possibility as an action that is easy for the user of the telephone station.

The above object is achieved, according to the present invention, in that a first capacitor is provided that is connected, first of all, to ground and, secondly, both to a first control input and to the feed voltage via a first ohmic resistor and via a second ohmic resistor and is also connected to ground via a collector-emitter path of a pnp transistor, via a diode, via a third ohmic resistor and via a second capacitor. Furthermore, the base of the transistor is connected to ground via a fourth ohmic resistor and via the cradle switch contact in the actuated condition of the cradle switch contact. The common junction of the third resistor and of the second capacitor is connected to the base of an npn transistor and is connected to ground via a fifth ohmic resistor. The npn transistor has its emitter connected to ground and has its collector, first of all, connected to the feed voltage via a sixth ohmic resistor and, secondly, to the reset input of the microprocessor. Furthermore, the fourth resistor is small in comparison to the first resistor and the first capacitor is small in comparison to the second capacitor.

An advantage deriving therefrom is that a reset pulse for the microprocessor can be generated in a simple manner by merely multiply actuating the cradle switch contact, this reset pulse effecting a resetting of the processor program to an initial position, whereas a single actuation of the cradle switch contact does not effect any intervention in the processor program.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENT

A normal operating condition is assumed first. The telephone station is situated in its quiescent condition. The handset is hung up and the cradle switch contact GU is open. In a manner not shown, the microprocessor MP routinely sequences its programs via the subscriber line (for example, indicating busy extension, indicating waiting subscribers, etc).

Figure 1:
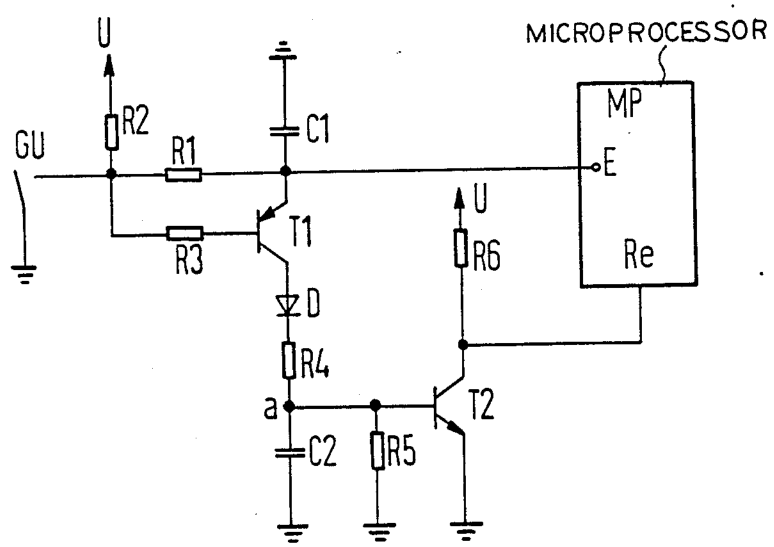
FIG. 1 is a schematic diagram of a circuit arrangement constructed in accordance with the present invention which contains the two transistors T1 and T2, the cradle switch contact GU, the capacitors C1 and C2, the ohmic resistors R1-R6, the diode D and, as indicated, the microprocessor MP.

According to FIG. 1, the potential U is available at the capacitor C1 by way of the resistors R1 and R2. High potential likewise is available at the input E of the microprocessor MP.

When the handset is lifted, ground potential is applied to the junction of the resistors R1, R2 and R3 by way of the contact GU. Low potential, on the other hand, is applied to the input E and the microprocessor recognizes "handset lifted up" during its routine interrogation.

The capacitor C1 is discharged to ground by way of the resistor R1, whereby the resistor R1 has a lower ohmic value than the resistor R2. Furthermore, the capacitor C1 is discharged to ground via the emitter-base path of a pnp transistor T1 and via a resistor R3 that has a value which is small in comparison to the value of the resistor R1. The transistor T1 is thereby briefly activated and a charge from the capacitor C1 flows into a capacitor C2 via the transistor T1, a diode D and a resistor R4. The capacitor C2 is significantly larger in capacitance value than the capacitor C1. Its voltage UC2 (FIG. 2, line b) assumes the value UX and is discharged to ground via a resistor R5. The charge of the capacitor C1 (FIG. 2, line a) now lies at 0 and will not rise to the value U again until the handset is placed down at the end of the call, that is the hook switch is operated. The transistor T2 remains unaffected during this operation since its switching threshold (US in FIG. 2, line b) is not reached. A flow back and discharge of the charge of the capacitor C2 is prevented by the diode D.

When it is now assumed that the microprocessor MP is no longer sequencing its program due to some type of disturbing pulse, i.e. has become stuck, then the subscriber can recognize this (abnormal flashing of the station lamps, no possibility of call set-up, etc.) and it is obvious that he will instinctly actuate the cradle switch contact repeatedly.

Figure 2:
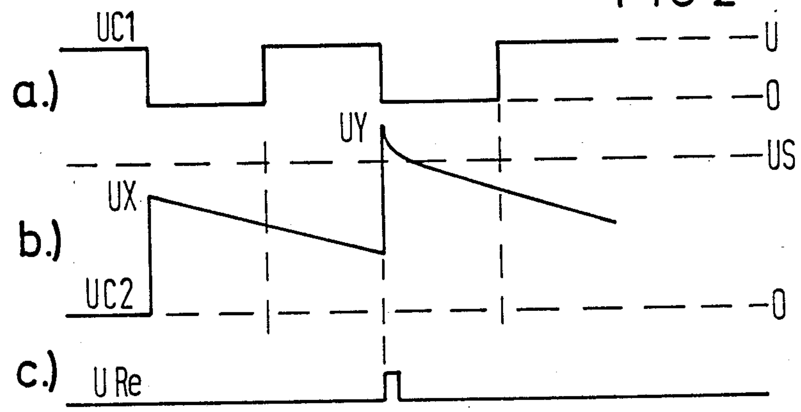
FIG. 2 is a graphic illustration showing the essential potentials arriving in the circuit arrangement of FIG. 1 such as the potential UC1 and the capacitor C1, the potential UC2 at the capacitor C2, and the potential URe at the reset input Re.

When, in the out-of-order condition, the cradle switch contact is opened (pressing the support down), then the capacitor C1 charges as described (UC1 form 0 to the value U in FIG. 2, line a).

When the cradle switch contact is opened, then the capacitor C1 discharges and the capacitor C2 assumes the charge UX (FIG. 2, line b).

When the cradle switch contact GU is repeatedly closed and opened in brief succession, the capacitor C2 cannot discharge fast enough by way of the (high impedance) resistor R5 and now assumes the charge UY (FIG. 2, line b). This charge, however, lies above the switching voltage US (FIG. 2, line b) of the transistor T2, so that the transistor is briefly activated. A current flows from ground by way of the transistor T2 and the resistor R6 and a reset pulse (FIG. 2, line c) for the reset input Re of the microprocessor MP is formed therefrom. The charge of the capacitor C2 then flows off by way of the resistor R5.

Whether the reset already occurs after a two-time actuation of the cradle switch contact or whether this must be done more frequently depends only on the rapidity of the operation of the contact. Given a one-time operation of the cradle switch contact (lifting the handset), by contrast, no resetting occurs.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for a digital telephone station in digital telephone systems whereby the telephone station is controlled by a microprocessor which includes a control input and a rest input, and whereby inquiry and control signals are constantly exchanged via the leads of the subscriber line, and whereby a feed voltage supply of the telephone station in the quiescent condition and in the voice condition occurs by way of the subscriber line or by way of a local voltage source, the improvement comprising:

cradle switch means for bringing said control input of said microprocessor to ground potential when said cradle switch means is in its actuated position;

a first resistor connected between said control input and said cradle switch means;

a first capacitor including first and second terminals, said first terminal of said first capacitor connected to said control input, said second terminal of said first capacitor connected to ground;

a second resistor including first and second terminals, said first terminal of said second resistor connected to a second terminal of said first resistor, said second terminal of said second resistor connected to said feed voltage;

a pnp first transistor having a collector, an emitter, and a base, said emitter of said pnp first transistor connected to said first terminal of said first capacitor;

a third resistor connected between said cradle switch means and said base of said pnp first transistor; and a diode including an anode connected to said collector of said first pnp transistor, and a cathode;

a fourth resistor including a first terminal connected to said cathode of said diode, and a second terminal;

a second capacitor including a first terminal connected to said second terminal of said fourth resistor and a second terminal connected to ground;

a fifth resistor connected in parallel with said second capacitor;

an npn second transistor having a base, an emitter and a collector, said emitter of said npn second transistor connected to ground, said base of said npn second transistor connected to said first terminal of said second capacitor; and a sixth resistor including a first terminal connected to said collector of said second npn transistor and to said reset input of said microprocessor, and a second terminal connected to said feed voltage.

* * * * *